May 29, 1951 E. E. K. SPARMANN Re. 23,371

WOBBLER DRIVE

Original Filed Oct. 28, 1946 2 Sheets-Sheet 1

INVENTOR:
Edmund Ernst Karl Sparmann
By Jarvis C. Marble
his Attorney

WOBBLER DRIVE

Original Filed Oct. 28, 1946 2 Sheets-Sheet 2

INVENTOR:
Edmund Ernst Karl Sparmann
By Daniel Marks
his Attorney

Reissued May 29, 1951

Re. 23,371

UNITED STATES PATENT OFFICE 23,371

WOBBLER DRIVE

Edmund Ernst Karl Sparmann,
Stockholm, Sweden

Original No. 2,463,818, dated March 8, 1949, Serial No. 706,181, October 28, 1946. Application for reissue August 25, 1950, Serial No. 181,481. In Sweden October 27, 1945

10 Claims. (Cl. 74—60)

Matter enclosed in heavy brackets [ ] appears in the original patent but forms no part of this reissue specification; matter printed in italics indicates the additions made by reissue.

The present invention relates to wobbler drives and particularly to an arrangement for transmitting the reaction moment from the wobble plate to the engine casing, as well as to the positive control of the virtual tangetial motion of the wobble plate. The invention accordingly relates to the group of wobble plate drives in which the wobble plate, also called wobble plate body or wobble plate crown, does not participate in the movement of the engine or motor axis, but only effects the characteristic wobbling motion relative to the engine casing. The present invention is adapted for use with all modifications of this group of wobble plate motors, also called spacial crank drives. The invention also is independent of the shape of the motor shaft as well as of the wobble plate body; the only basic condition required is that the wobble plate body together with the connecting points or joints for the piston movement is rotatably mounted relative to the motor shaft, but does not participate with the rotation thereof, or, when the casing and the working cylinders rotate (as may be the case with so called revolving motors and the like), also the wobble plate rotates at the same speed, in which case however the motor shaft is stationary. In this case the wobble plate effects, in addition to its movement of rotation about the motor shaft, its wobbling motion relative to the engine casing and to the working piston.

The invention also is independent of the manner of positive transmission of movement between the wobbling plate and the working pistons, and also independent of the purpose for which the wobble plate motor serves, the arrangement according to the present invention therefore can be used with prime movers or working engines.

Owing to the many advantages that can be realised with satisfactorily operating wobbler plate motors, particularly in view of the relatively small weight and reduced space required, numerous proposals have already been made to solve this problem, but so far without any practical success. Usually the cause of lack of practical results has been due to the fact that the purely theoretical and cinematic requirements were unknown or had not been observed, or the proposed constructions were too complicated and unable to withstand the mechanical stress or other operating conditions of high rated motors.

The theoretic basic condition for using the spherical crank drive to transform the rectilinear piston motion into a rotary motion of the motor shaft or vice-versa is that the cinematics of the spherical crank drive used are equivalent to those of a planary crank drive having a connecting rod of infinite length. Only in this case it is at all possible to realise a completely dynamic balancing of the engine, that is to say to make it practically operable. A wobbler motor in which the wobbler plates does not rotate with the motor shaft, but is rotatably mounted on the shaft, complies with the above mentioned basic condition of cinematics only when all connecting points of the piston mechanism on the wobbling plate describe congruent lemniscate-shaped paths situated on a spherical surface. Accordingly it is not possible to prevent rotation of the wobbling plate relative to the engine casing or to take up the torque of the engine by guiding, for example, a point or a radius of the wobbler plate along a plane segmental arc. In this case all other points or radii of the wobbler plate plane, also the piston connections, would describe different paths and would be subjected to different conditions of acceleration of a very complicated nature.

It is however sufficient to correctly control the movement of a single point or radius of the wobbler plate plane according to the cinematic laws of the wobbler drive, as in this case also all other points or radii move along paths which are identical to that of the controlled point.

According to the present invention a point of the wobbler plate, preferably situated remote from the center of the plate, is coupled with a reciprocating motion disposed parallel with the shaft of the wobbler drive so as to oblige the said point to move in a direction parallel with said shaft, the geometrical axis of the reciprocating motion being compelled, by means of a crank mechanism, to move along a cylindrical surface in the same direction of rotation as the drive shaft but with twice the number of revolutions, while the said cylindrical surface is substantially of a diameter so as to impart to the radius of said coupled point in the wobbler plate plane, an amplitude of $\pm\beta$ in tangential direction in a plane extending at right angles to the drive shaft, sine $\beta$ being substantially equal to $$\frac{1-\cos\alpha}{1+\cos\alpha}$$

when $\alpha$ indicates the angle of inclination of the crank pin of the wobbler plate drive relative to the drive shaft.

The accompanying drawings illustrate three embodiments of the present invention, which enable the obtaining of the theoretically required characteristics of motion by means of simple and reliable mechanical means.

Figure 1:
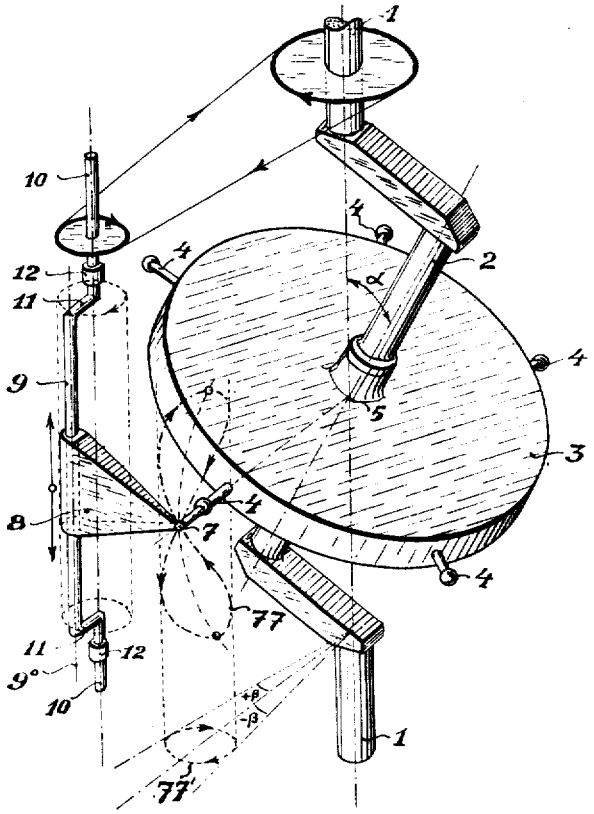
Fig. 1 is a perspective representation showing diagrammatically the principle of a wobbler plate drive according to the invention.

In Fig. 1 the shaft 1 of the wobbler plate drive system comprises an inclined crank pin 2 which intersects at the point 5 the center line of the shaft 1 at angle $\alpha$. The plane situated at right angles to the inclined crank pin 2 and extending through the point of intersection 5 is called the wobbler plate plane, and point 5 the center of the wobbler plate. The inclined crank pin 2 rotatably carries the wobbler plate or body 3 which is not movable in axial direction. The wobbler member is shown in Fig. 1 for the sake of simplicity and clearness as a cylindrical disk. Practically, the wobbler member usually has the shape of a double cone with a common base surface, situated in the wobbler plate plane. The wobbler plate 3 is provided with connecting pins 4 projecting radially from the periphery of the plate. Each pin 4 is connected to its corresponding working piston, respectively, to the piston rod, as shown in Fig. 1 by means of a ball joint. The pistons and piston rods have been omitted in the drawing, as these latter can be constructed in any desired manner independently of the present invention. Also the working cylinders have been omitted. The connections for the working pistons, shown in the figures as ball joints, can be constructed also otherwise, provided they permit the necessary liberty of spacial movement of the pins.

Should the wobbling plate *not* be prevented from participating in [at] the rotation of the shaft 1 or the inclined crank pin 2, the whole mechanism would be inoperative, that is to say the reacting torque could not be taken up. This task is rendered difficult, as already had been mentioned, by the fact that all connecting joints 4 must describe congruent spacial lemniscate-shaped loop paths, in order for the wobbler plate drive to become practically useful.

The invention is based on the fact, that the axial projection of the lemniscate-shaped spacial loop path which is described by each connecting point 4 at each full rotation of the engine shaft, forms a small circle, which is described in the same direction as the direction of rotation of the shaft 1, but with twice the speed. These small circles forming the projections of the paths of the connecting points, are situated within an involute circle, having a radius equal to the distance of the points 4 from the center line of the inclined pin 2, drawn around the center 5. This means that the special lemniscate described by a point situated in the plane of the wobbler plate can also be defined as the line of intersection between a spherical surface having the above mentioned radius and a cylindrical surface. The radius of this cylindrical surface is determined by the fact that the planes extending through the geometrical axis of the shaft 1 tangentially to the cylindrical surface form an angle $2\beta$, sine $\beta$ being equal to $$\frac{1-\cos\alpha}{1+\cos\alpha}$$

when $\alpha$ indicates the angle of inclination of the inclined crank pin 2 relative to the axis 1 of the drive. In other words this means that every radius of the wobbler plate plane effects a virtual tangential and harmonic oscillation about a central position with an amplitude of $\pm\beta$, but having the double frequency than that corresponding to the number of revolution of the shaft of the drive.

In accordance with the above stated facts, the rotation of the wobbler plate 3 together with the axis 1 is prevented by connecting a point, such as 7, situated in the plane of the wobbler plate, by means of a universal joint with three degrees of liberty, for example by means of a ball joint, with a reciprocating motion device, disposed parallel to the shaft 1 of the drive system, for example with a slide member 8 shown in Fig. 1 movable along a straight guide 9 parallel to the shaft 1. This reciprocating motion guide 9, however, is not stationary relative to the engine casing, but is preferably associated with a crank drive or, as shown in Fig. 1, formed as the crank pin of a crank shaft 10 with crank arms 11. This crank shaft 10 is mounted in bearings 12 so as to be rotatably but not axially movable relative to the engine casing, and is preferably driven by the shaft 1, through the medium of a suitable transmission, such as gears, chain drives or the like, in the same direction of rotation but at double the number of revolutions of the shaft 1. The reciprocating motion guide 9, or rather its geometrical axis, then describes twice for each revolution of the shaft 1 a cylindrical surface parallel to the shaft 1. The slide member 8 maintains the point 7 or the radial line situated in the wobbler plate plane and extending through the point 7, at a constant distance from the guide 9. If now the stroke of the crank drive 9, 10, 11 is so chosen that the radial line of the wobbler plate plane extending through the point 7 effects, owing to being connected with this crank drive, an oscillation having an amplitude $\pm\beta$ about the axis 1, where sine $\beta$ is again equal to $$\frac{1-\cos\alpha}{1+\cos\alpha}$$

and $\alpha$ is the angle of inclination of the inclined crank pin 2, then the point 7 describes the theoretically required path which is drawn in Fig. 1 as dash and dot double loop line 77 (owing to the perspective representation the loops appear non-symmetric and distorted).

The axial projection of this spacial lemniscate 77 is a circle and appears in Fig. 1 owing to perspective representation as ellipse.

All connecting pins 4 situated in the plane of the wobble plate move along paths which are congruent among themselves, which, as mentioned, is the required basic condition that the entire wobbler plate drive including all reciprocating masses are completely dynamically balanced.

Fig. 1 is a diagrammatic representation only, in which all parts not necessary for the comprehension of the invention have been omitted intentionally. Moreover, the dimensions of the various parts have been chosen from the point of view of a clear illustration. It is to be pointed out that the spacial lemniscate 77 in a practical embodiment of the drive would be much thinner, having only about one tenth of the represented width. For this reason the stroke of the crank drive of the reciprocating motion device carrying the slide member 8 will actually be much smaller than appears in Fig. 1.

Figure 2:
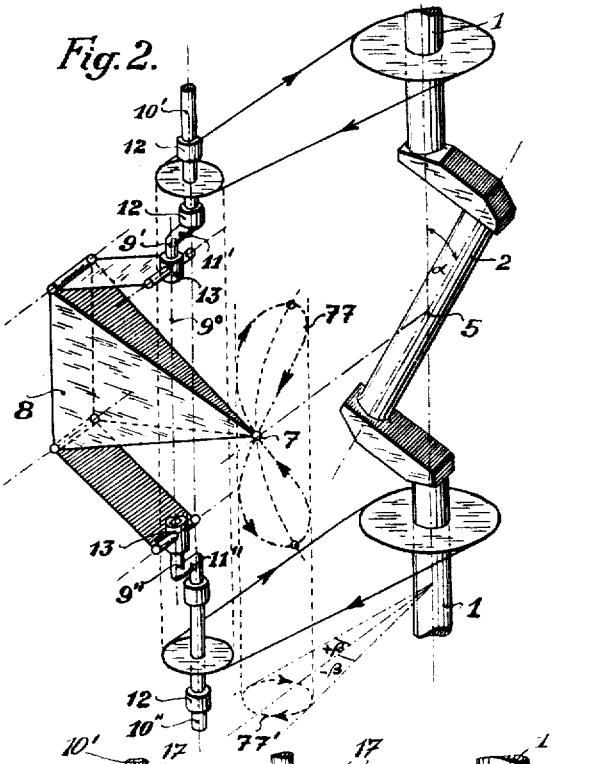
Fig. 2 shows a modification of the wobbler plate drive, also in perspective view.

Fig. 2 shows a modification of the invention which differs from the first example in that point 7, instead of being connected to a slide member of a reciprocating motion having sliding friction, is connected to a link motion, as for instance to a Roberts triangular link.

To effect a reciprocating motion by means of a guide link motion, preferably by means of the Roberts triangular link, results in a considerable decrease of the reciprocating motion resistance, since this resistance is limited to the extremely small friction of the pins in the articulations which still can be reduced if desired by providing needle bearings at the joints.

Fig. 2 further shows a modification which is advantageous in many cases, that is to divide the crank drive for controlling the virtual tangential oscillation of the wobbler plate radii for example in two separate coordinated overhung crank drives 9′, 10′, 11′ and 9″, 10″, 11″. This separation of the crank drive permits avoiding the various disadvantages which a comparatively long crank pin 9 as shown in Fig. 1 could cause. Such a traversing crank pin 9 would be undesirable when using a Roberts triangular link since it would have to penetrate through the link. When separating the crank drive for controlling the circular movement of the reciprocating motion guide on a cylindrical surface, by using two single cranks 9′, 11′ and 9″, 11″ disposed relative to each other like specular images as shown in Fig. 2, these cranks must be separtely driven, for example by the engine shaft 1, as shown in Fig. 2, or, if desired, through the medium of an auxiliary shaft, and both coordinated crank drives 9′, 10′, 11′ and 9″, 10″, 11″ are driven synchronously at double engine shaft speed by any suitable transmission. Each crank drive is provided with a bearing 13 by means of which the control link 8 is rotatably suspended on the crank pins 9′ and 9″.

For reason of clearness the wobbler plate body has not been represented in Fig. 2, but only the shaft 1 of the drive system, as well as the point 7 to be controlled and its radial line to the center 5.

Figure 3:
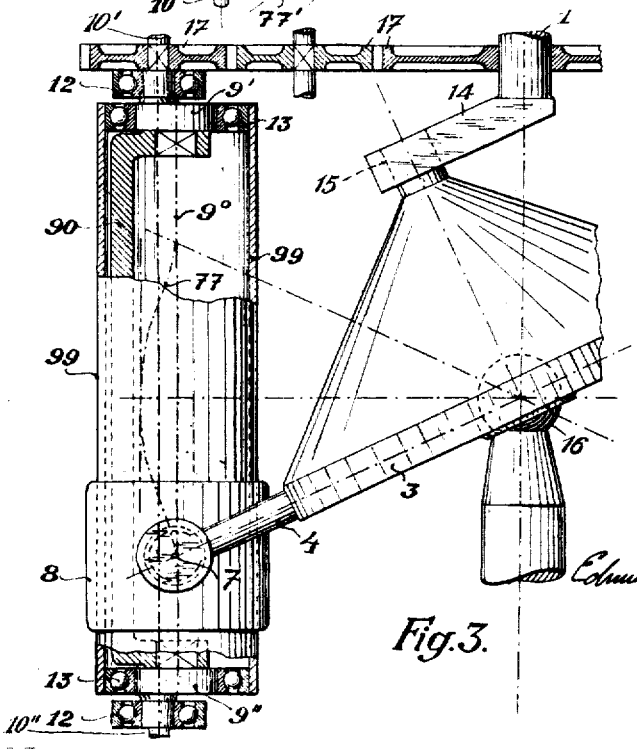
Fig. 3 is a further modification viewed at right angles to the motor shaft, certain details being shown in section.

Fig. 3 shows a further modification of the invention. Also this construction shows the tendency not to use the crank pin 9 directly as a reciprocating motion guide. This modification also shows how the invention is applied to such forms of the wobbler plate drive in which no traversing Z-shaped engine shaft 1 is used. The shaft 1 in Fig. 3 does not traverse the wobbler plate body, but consists of a simple crank 14 with an inclined trunnion bearing, for example, in order to guide the circular movement at the summit of the wobbler plate body 3 of conical shape which is mounted at the center of its base surface on a spherical joint 16. Since it is not possible, in this modification of the engine shaft 1, to directly drive the lower crank drive 9″, 10″ from the shaft 1, this crank drive can be positively actuated, as shown, by a connecting member 90, which transmits the required torque from the upper crank drive 9′, 10′ to the lower crank drive 9″, 10″. The upper crank drive is rotated in known manner, for example by the intermediary of gears 17 or the like by the shaft 1, in analogous manner as in the two first examples.

The connecting member 90 which forms the positive coupling for rotation in unison of the two coordinated drive sections of the reciprocating motion drive, is so arranged that its center of gravity is situated on the side of the axis of rotation 10′—10″ opposite the axis 9° of the tube 99, in order to form at the same time a counterweight for dynamically balancing the reciprocating motion device moving along a cylindrical surface.

In the example shown in Fig. 3 the crank pins of the two coordinated portions of the control crank drive are formed as eccentrics 9′ and 9″ carrying the bearings 13 for the suspension of the reciprocating motion device constituted by a tube or guide 99 of relatively large diameter, along which the slide member 8 can move. The tube 99 provides the necessary resistance and rigidity against flexure and maintains the specific surface pressure between the reciprocating motion guide 99 and the slide member 8 within reasonable limits to guarantee reliable operation. The reciprocating motion guide must be capable of supporting the entire stress resulting from the reaction moment of the engine. In order to reduce this stress it is advantageous to choose a point of the wobbler plate plane for coupling with the reciprocating motion device which has the greatest possible distance from the center of the wobbler plate, as for example a point 7 situated outside of the wobbler plate body 3, on a connecting pin 4.

The fact that the reciprocating motion tube 99 is rotatably mounted relative to the control crank drive 9′, 10′, and 9″, 10″ is essential for reducing friction and increasing the safety of operation. If the reciprocating motion tube 99 were not rotatable relative to the control crank drive, the friction and the speed of relative sliding movement between the slide member 8 and the tube 99 would result in a superposition of the axial reciprocating movement of the slide member 8 with the movement of rotation of the tube 99 turning at double engine speed within the member 8.

Naturally, the sliding friction between slide member 8 and reciprocating motion tube 99 could be transformed into the smaller rolling friction by providing between these two members axial roller bearings of known type, for example as those used in modern constructions of shock absorbing legs of airplane landing gears.

The slide member 8 is connected to the pin 4 at the point 7 by means of a ball joint or an equivalent link articulation.

The invention is not limited to the constructional embodiments shown in the drawings, as many other modifications are possible within the scope of the claims. It may be arranged to control the movement of two or more points or radii of the wobbler plate, instead of a single point, as shown; the positive control of a single point of the wobbler plate to move along the theoretically correct path however is the preferred construction for many reasons. It may be mentioned that small deviations from the theoretically and absolutely correct path of movement of the points of the wobbler plate do not result in any particular difficulties, and for this reason it is not necessary to construct the described wobbler plate drive with such an extreme precision as to unduly increase the cost of production.

I claim:

1. A shaft and a wobbler drive system comprising a wobbler plate disposed at an angle to the shaft, a reciprocating motion device having its axis extending parallel with the shaft of the drive system, said reciprocating motion device being operatively connected to a point of the wobbler plate plane remote from the center of the wobbler plate, a crank mechanism connected to said reciprocating motion device to impart to the geometrical axis thereof a circular motion along a cylindrical surface in the direction of rotation of the shaft of the drive system but at twice the speed of said shaft, whereby a radius of the wobbler plate plane extending through said point which is operatively connected to the reciprocating motion device effects an angular oscillation of $\pm\beta$ in a plane at right angles to the shaft of the drive system, sine $\beta$ being substantially equal to $$\frac{1-\cos\alpha}{1+\cos\alpha}$$

and $\alpha$ being the angle of inclination of the wobbler plate axis relative to the shaft of the drive system.

2. A wobbler drive system as claimed in claim 1, wherein the reciprocating motion guide is rotatably mounted relative to the crank mechanism which causes the axis of said reciprocating motion guide to move along a cylindrical surface.

3. A wobbler drive system comprising a shaft, a wobbler plate mounted on said shaft at an angle to the axis of the shaft and maintained against rotation with the shaft, a reciprocating motion device having its axis extending parallel with the axis of the drive system, said reciprocating motion device being operatively connected to a point of the wobbler plate plane remote from the center of the wobbler plate, a pair of coordinated crank drives connected to the reciprocating motion device at opposed ends of the axis thereof, said two crank drives being disposed relative to one another so that one crank drive forms the specular image of the other one, said two crank drives actuating the reciprocating motion device to cause said point of the wobbler plate operatively connected to the reciprocating motion device to effect a circular movement along a cylindrical surface in the direction of rotation of the shaft of the drive system at twice the speed of said shaft, whereby the radius of the wobbler plate plane extending through said point connected to the reciprocating motion device effects an angular oscillation of $\pm\beta$ in a plane at right angles to the axis of the drive system, sine $\beta$ being substantially equal to $$\frac{1-\cos\alpha}{1+\cos\alpha}$$

and $\alpha$ being the angle of inclination of the wobbler plate axis relative to the axis of the drive system.

4. A wobbler drive system as claimed in claim 3, wherein the said two crank drives comprise eccentrics connected to each other by means of a rigid coupling member forming a positive driving connection between the two crank drives.

5. A wobbler drive system as claimed in claim 3, wherein the said two crank drives comprise eccentrics connected to each other by means of a coupling member forming a positive driving connection between the two crank drives, said coupling member being situated on that side of the axis of rotation of the crank drives which is opposite the axis of the eccentrics.

6. A wobbler drive system as claimed in claim 1 in which the reciprocating motion device effecting a circular motion is constituted by a guide link drive.

7. A wobbler drive system as claimed in claim 1, wherein the reciprocating motion device effecting a circular motion is a triangular link.

8. A wobbler drive system as claimed in claim 1, wherein the reciprocating motion device effecting a circular motion comprises a tube rotatably mounted relative to the control crank mechanism, and a slide member movable therealong, said slide member being coupled by means of a ball joint or the like with a point of the wobbler plate plane.

9. A wobbler drive system as claimed in claim 1, wherein the point coupled with the reciprocating motion device effecting a circular movement is situated outside of the wobbler plate body.

10. A wobbler drive system as claimed in claim 1, wherein the point of the wobbler plate plane coupled with the reciprocating motion device is situated on an extension of a connecting pin provided for coupling the wobbler drive to a working piston.

EDMUND ERNST KARL SPARMANN.

No references cited.

Certificate of Correction

Reissue No. 23,371 May 29, 1951

EDMUND ERNST KARL SPARMANN

It is hereby certified that error appears in the printed specification of the above numbered patent requiring correction as follows:

Column 1, line 7, for the words "the group" read *that group*; column 2, lines 48 and 49, and column 3, lines 72 and 73, for $$\frac{1-\cos\alpha}{1+\cos\alpha} \text{ read } \frac{1-\cos\alpha}{1+\cos\alpha}$$

same column 3, line 62, for "special" read *spacial*;

and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*